United States Patent
Werner et al.

(10) Patent No.: US 8,051,091 B2
(45) Date of Patent: Nov. 1, 2011

(54) PARALLELIZING DATA MANIPULATION BY DATA SET ABSTRACTION

(75) Inventors: Horst Werner, Muehlhausen-Rettigheim (DE); Christof Bornhoevd, Belmont, CA (US)

(73) Assignee: SAP AG, Walldorf (DE)

( * ) Notice: Subject to any disclaimer, the term of this patent is extended or adjusted under 35 U.S.C. 154(b) by 381 days.

(21) Appl. No.: 12/033,504

(22) Filed: Feb. 19, 2008

(65) Prior Publication Data

US 2009/0210433 A1    Aug. 20, 2009

(51) Int. Cl.
*G06F 17/30* (2006.01)

(52) U.S. Cl. .................. 707/758; 707/764; 707/769

(58) Field of Classification Search .............. 707/758, 707/764, 999.001, 99.008, 999.003, 999.008, 707/769; 719/318, 321; 714/4, 316
See application file for complete search history.

(56) References Cited

U.S. PATENT DOCUMENTS

| | | | | |
|---|---|---|---|---|
| 6,058,388 | A * | 5/2000 | Molloy | 707/682 |
| 6,076,085 | A * | 6/2000 | Iwata et al. | 1/1 |
| 6,128,615 | A * | 10/2000 | Molloy | 717/108 |
| 6,233,599 | B1 * | 5/2001 | Nation et al. | 718/102 |
| 6,304,866 | B1 * | 10/2001 | Chow et al. | 1/1 |
| 6,374,238 | B1 * | 4/2002 | Iwata et al. | 707/769 |
| 6,665,682 | B1 * | 12/2003 | DeKimpe et al. | 1/1 |
| 6,691,166 | B1 * | 2/2004 | Gasior et al. | 709/232 |
| 6,748,534 | B1 * | 6/2004 | Gryaznov et al. | 713/188 |
| 6,801,919 | B2 * | 10/2004 | Hunt et al. | 1/1 |
| 6,816,854 | B2 * | 11/2004 | Reiner et al. | 707/770 |
| 6,850,947 | B1 * | 2/2005 | Chung et al. | 707/600 |
| 6,978,461 | B2 * | 12/2005 | Shapiro et al. | 719/311 |
| 7,159,215 | B2 * | 1/2007 | Shavit et al. | 718/100 |
| 7,192,633 | B2 * | 3/2007 | Fransen | 428/101 |
| 7,516,151 | B2 * | 4/2009 | Norton et al. | 1/1 |
| 7,716,192 | B2 * | 5/2010 | Petrank et al. | 707/695 |
| 2002/0198882 | A1 * | 12/2002 | Linden et al. | 707/10 |
| 2003/0005029 | A1 * | 1/2003 | Shavit et al. | 709/107 |
| 2004/0122792 | A1 * | 6/2004 | Salazar | 707/1 |
| 2005/0108251 | A1 * | 5/2005 | Hunt | 707/10 |
| 2006/0095910 | A1 * | 5/2006 | Norton et al. | 718/100 |
| 2006/0271507 | A1 * | 11/2006 | Anzalone et al. | 707/2 |
| 2007/0094529 | A1 * | 4/2007 | Lango et al. | 714/4 |
| 2007/0233453 | A1 * | 10/2007 | Ito et al. | 703/26 |
| 2009/0234826 | A1 * | 9/2009 | Bidlack | 707/5 |

\* cited by examiner

*Primary Examiner* — Thanh-Ha Dang
(74) *Attorney, Agent, or Firm* — Fish & Richardson P.C.

(57) ABSTRACT

A first request to access a first set of items is received, wherein each item is associated with one or more properties. A second request to access a second set of items is also received. A determination is made as to whether items from the first set are in the second set of items, and the sets are divided into one or more subsets based on the determining. Each of the one or more subsets is assigned to a respective thread, and the respective thread of the subset that does not contain items in the second request is processed. This way, individual subsets (i.e. data partitions) can be processed by multiple threads in parallel without having to synchronize them.

20 Claims, 4 Drawing Sheets

PARALLELIZING DATA MANIPULATION BY DATA SET ABSTRACTION

BACKGROUND

The disclosure relates to information management.

Future hardware may eventually offer a large number of hardware threads that can operate on shared memory. A basic problem of multiple threads operating on shared memory is concurrency control. In particular, handling the simultaneous access to items in a database may be problematic. For example, more than one application can try to access the same items in a database for different retrieval or manipulation operations.

SUMMARY

Disclosed herein are systems, apparatus and methods for data partitioning. The present invention provides an approach to dynamically partition the data in a database based on the given requests to allow multiple threads to process each partition in parallel without having to synchronize them (e.g. lock the data).

In one implementation, a first request to access a first set of items is received, wherein each item is associated with one or more properties. A second request to access a second set of items is also received. A determination as to whether items from the first set are in the second set of items is made and the sets are divided into one or more subsets based on the determining. Each of the one or more subsets is assigned to a respective thread. The threads for the different disjoint subsets can now be executed in parallel without interference.

According to a further general implementation, a computer program product is tangibly embodied in a computer-readable medium. The computer program product includes instructions that, when read by a machine, operate to cause data processing apparatus to receive a second request to access a second set of items; determine whether items from the first set are in the second set of items; divide the sets into one or more subsets based on the determining; assign each of the one or more subsets to a respective thread; and process the respective thread of the subset that does not contain items in the second request.

Other implementations are disclosed which are directed to systems, methods, computer program products, and computer-readable mediums.

DETAILED DESCRIPTION

Figure 1:
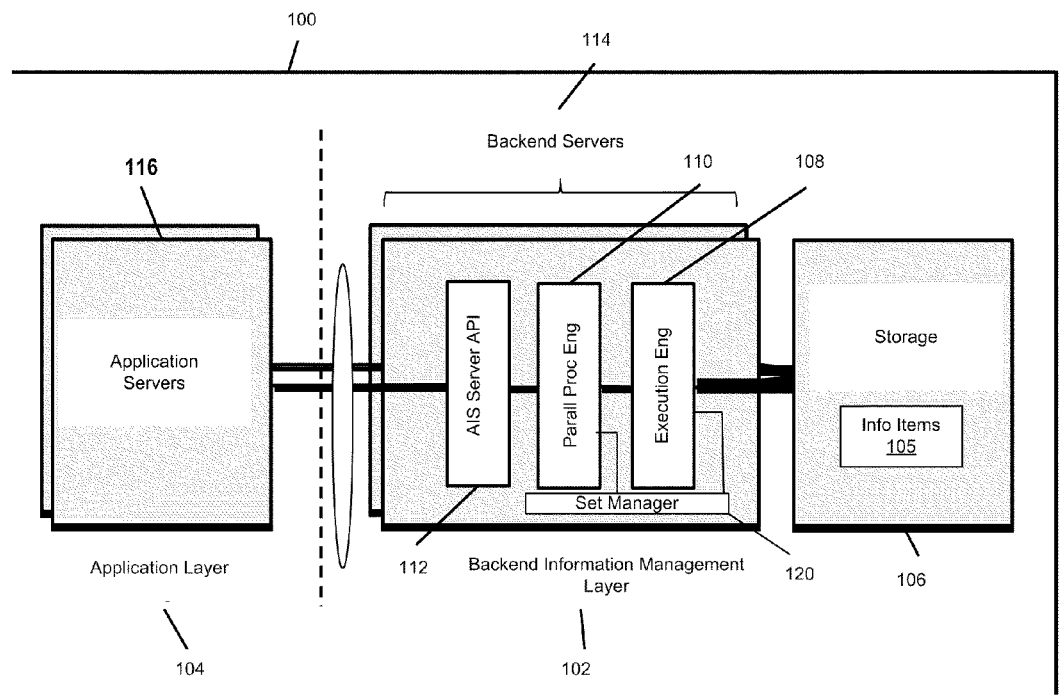
FIG. 1 is a block diagram of an implementation of an information management system.

FIG. 1 is a block diagram of an implementation of a system 100 that can be used to implement the invention. In one implementation, the information management system 100 can include a Backend Information Management Layer 102 providing data management and persistency functionality, and an Application Layer 104 hosting applications that make use of the information management system. The system 100 can, for example, be implemented in the example computer system of FIG. 4.

In one implementation, the Backend Information Management Layer 102 can include a Storage module 106. Info Items 105 and their Associations are stored in the storage module 106. Requests to the Server Application Program Interface (API) 112 can be sent from the Application Server Layer 104 in the form of complex processing requests, via the Server API 112. Application programs 116 that make use of the information management system's functionality can be deployed at the Application Layer 104 and can access a Backend Server instance via a stateless Server API. Due to this stateless API Backend Servers can be treated as resource pools where every server instance can handle every application request.

In one implementation, the application servers 116 contain all the application logic and interact with the backend servers. In one implementation, a separate user interface (UI) layer can exist on top of the application layer 104. In other implementations, the application servers 116 can also be invoked by web service calls. The application server 116 sends queries or processing requests to a backend server instance 114, in which the Server API 112 decodes the incoming requests, the parallel processing engine dynamically schedules parts of the processing request on parallel execution threads respectively. The execution engine 108 can execute these parts in the individual working threads; in one implementation it is decoupled from the parallelization. The execution engine 108 can fetch Info Items 105, associations and attributes from the storage 106 when needed.

In one implementation, the storage 106 can store the Info Items 105 which are collections of attributes and which play the role of data objects in a conventional database, and associations, which associate the Info Items 105 with each other. In one implementation, attributes associate Info Items with attribute values. A set of Info Items 105 can, for example, either be defined by explicitly listing its elements or by describing the way it is created out of other sets, e.g., by filtering or set unification.

In one implementation, the system 100 can substitute the access to the actual Info items 105 by access to "Info Item sets" which are an abstract description of collections of Info Items by their common properties (e.g., the query parameters used to select a set). The application is therefore given an abstract representation of the requested set and allowed to specify operations on this set already before it is resolved (i.e. its individual Info Items are retrieved to the application).

In one implementation, this is accomplished by a central set manager 120, which handles a "cache" of unresolved and resolved sets and schedules the threads for resolving and manipulating sets. Any request for the selection or manipulation of a set of Info Items is going to the set manager 120, which either immediately hands over an unresolved set, or—if the request necessitates a resolved set—schedules the resolving of the set and, when the corresponding thread is finished, raises an event containing a handle to the resolved set (this can be a snapshot or a writable (locked) set of items).

Figure 2:
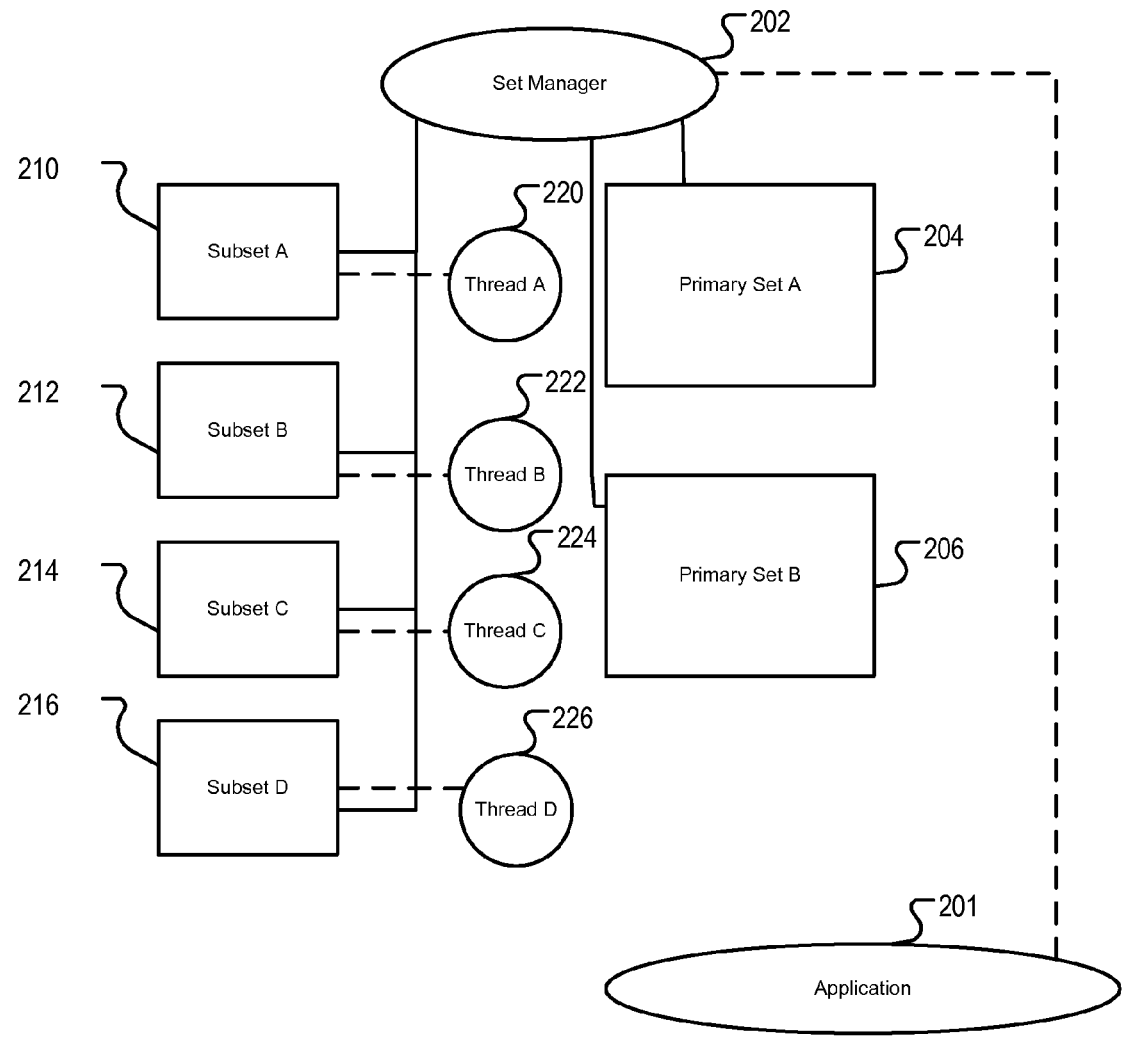
FIG. 2 is a block diagram displaying an example of data partitioning.

FIG. 2 illustrates how the info items are split into various sets. In one implementation, if a new set of info items 105 is requested and there already are other (resolved or unresolved) sets in the cache, parallel threads that resolve and manipulate these sets later on do not interfere with each other's data. Therefore, each of the already existing sets is split up into two sets, the intersection with the new set and a set containing the rest of the info items that are not in the intersection with the new set.

The initially requested sets 204, 206 are referred to as "primary sets" in order to distinguish them from the subsets, 210, 212, 214, 216. Each subset 210, 212, 214, 216 can be assigned to a separate working thread 220, 222, 224, 226, which actually updates the record sets. Since the subsets 210, 212, 214, 216 are disjunctive, it is ensured that the threads 220, 222, 224, 226 do not run into concurrency issues.

In one implementation, whenever a primary set 204, 206 is resolved for further processing on the level of individual Info Items 105, each item that is created is tested for the membership criteria of all current unresolved sets, and if overlaps exist, the appropriate subsets 210, 212, 214, 216 are created and assigned to all of the corresponding super sets. Such subsets can be processed by separate threads without having to synchronize them.

In some implementations, the subsets, which are intersections of two or more primary sets, can only be processed when the operations to perform on each of their supersets are known. Then, all these operations are carried out by the one thread that processes the subset, in the order of the transactions the operations belong to.

For example, application A requests the set of all products of category "consumer electronics." Application B requests the set of all products that have a price below $50. The set manager 120 now divides the whole database of Info Items into four abstract and disjunctive sets:

| | |
|---|---|
| Set of all consumer electronics products from $50 upward | Set of all consumer electronics products below $50 |
| Set of all non-"consumer electronics" products below $50 | Set of all non-"consumer electronics" products above $50 category |

The Application B wants to derive the set of the associated orders from the set of all products below $50, so this set needs to be resolved. The Info Items are selected and read. As soon as one Info Item is read which fulfils the criterion of the second unresolved set (category=consumer electronics), the set is split up into 2 subsets representing (1) the products that are not in the consumer electronics category and (2) the intersection of the both primary sets (i.e. consumer electronics<$50). Now a thread can be started that operates on all the items, which are not in the consumer electronics primary set. The elements in the other set, however, need to wait until the operation on the consumer electronics products is defined, for example, a price increase of 10%. Then two more threads are started: (1) The one that handles the price increase on all products >$50, and (2) one that handles both the price increase and the retrieval of associated orders for the intersection set.

In one implementation, as soon as all subsets 210, 212, 214, 216 of a primary set, ex. 204, have been processed, they can be merged into the primary set 204 and no longer exist as own their own.

In one implementation, if an application 201 selects a set of Info Items with certain criteria, a handle to an abstract set, i.e., 210, is given back, and the resolving of the set, i.e., 204, is queued and performed by the next available thread. When the application 201 specifies an operation (e.g. retrieve all orders for the given set of Info Items), it gets back a handle on an abstract result set 210; the original set 204 is annotated with the operation and an event is raised. When the original set 204 is resolved, several parallel threads are started that evaluate the intersections with the remaining unresolved sets (one thread per set). As soon as all operations of the relevant primary sets, i.e., 204, 206, are known for a subset, i.e., 210, the processing of the Info Items in the subset 210 with the annotated operations is queued. Again, an available hardware thread takes the task and raises an event when finished.

When all subsets, i.e., 210, 212, 214, 216, are processed, the result set is completely resolved and again, an event is raised, so that potential further operations that have been defined for the result set by the application can be carried out in the same way.

If in the previous example, the thread that processes the intersection set of consumer electronics products below $50 raises the price of a product above $50, i.e. performs an update operation in the database, the rank of the two operations (i.e. the sequence of their corresponding transactions) needs to be taken into account:

If the price change occurs in the later transaction, there is no problem. The data that the first transaction sees does not incorporate the price change.

If the earlier transformation changed the price, the membership of the product must be changed: It is put into the set of the products above $50. If an operation on that set has already been performed, it needs to be re-queued, so that the changed data is taken into account. Therefore, all changes on attributes that also occur in the membership criteria are monitored during the execution of a work thread.

In one implementation, separate tables can be kept for specific subsets 210, 212, 214, 216 with common properties that belong together from a semantic point of view. The number of attributes to be stored in these tables themselves can be significantly reduced by having the common attributes stored only once for the whole table. In another implementation, dynamic reorganization of these tables can be performed by observing which subsets 210, 212, 214, 216 are frequently used. For such subsets, dedicated tables are created, so that cross-table access is avoided.

Figure 3:
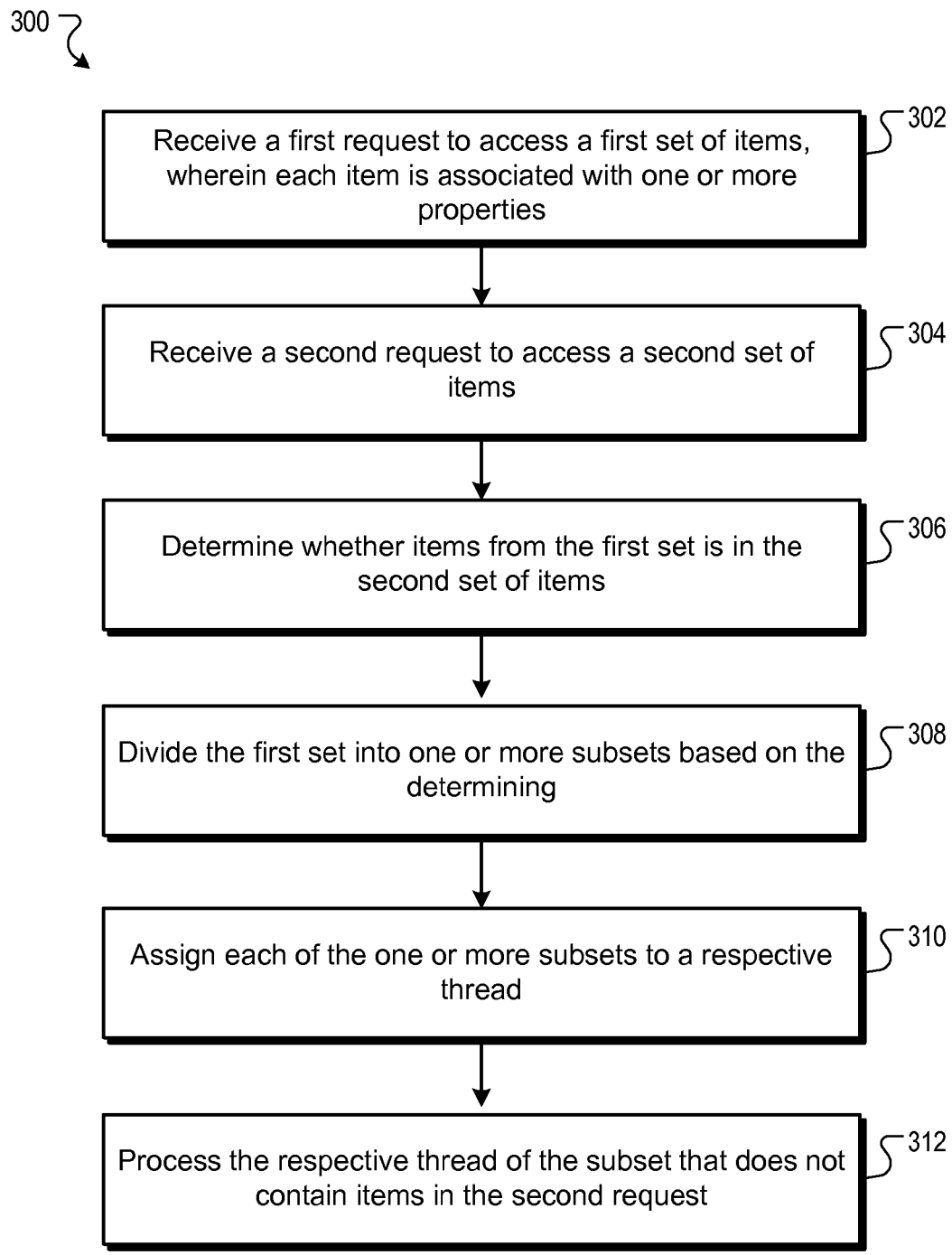
FIG. 3 is a flow diagram of an example process for handling access to items in a database.

FIG. 3 is a flow diagram of an example process 300 for handling access to info items in a database. The process 300 can, for example, be implemented in a system such as the system 100 of FIG. 1.

Stage 302 receives a first request to access a first set of info items, wherein each info item is associated with one or more properties. For example, the set manager 120 can receive a first request to access a first set of info items, wherein each info item is associated with one or more properties.

Stage 304 receives a second request to access a second set of info items. For example, the set manager 120 can receive a second request to access a second set of info items. The application servers 116 may, for example, need to access the same info items that are in the first set. The second set of info items are also associated with one or more properties.

Stage 306 determines whether items from the first set are in the second set of items. For example, the set manager 120 can determine whether items from the first set are in the second set of items. The determination can be made, for example, by comparing the items in the first set and the second set. The set manager 120 can determine whether any of the items are the same in the first and second set.

Stage 308 divides the first set into one or more subsets based on the determining. For example, the set manager 120 can divide the first set into one or more subsets based on the determining. The first set can be divided into the one or more subsets based on the properties associated with each info item. If, for example, the first request and the second request need access to the same info items, the info items can be split based on the properties and which info items need to be accessed in each request.

Stage 310 assigns each of the one or more subsets to a respective thread. For example, the parallel processing engine 110 can assign each of the one or more subsets to a respective thread. Each thread can be processed separately until the info items are resolved.

Stage 312 processes the respective thread of the subset that does not contain info items in the second request. For example, the execution engine 108 can process the respective thread of the subset that does not contain info items in the second request.

Figure 4:
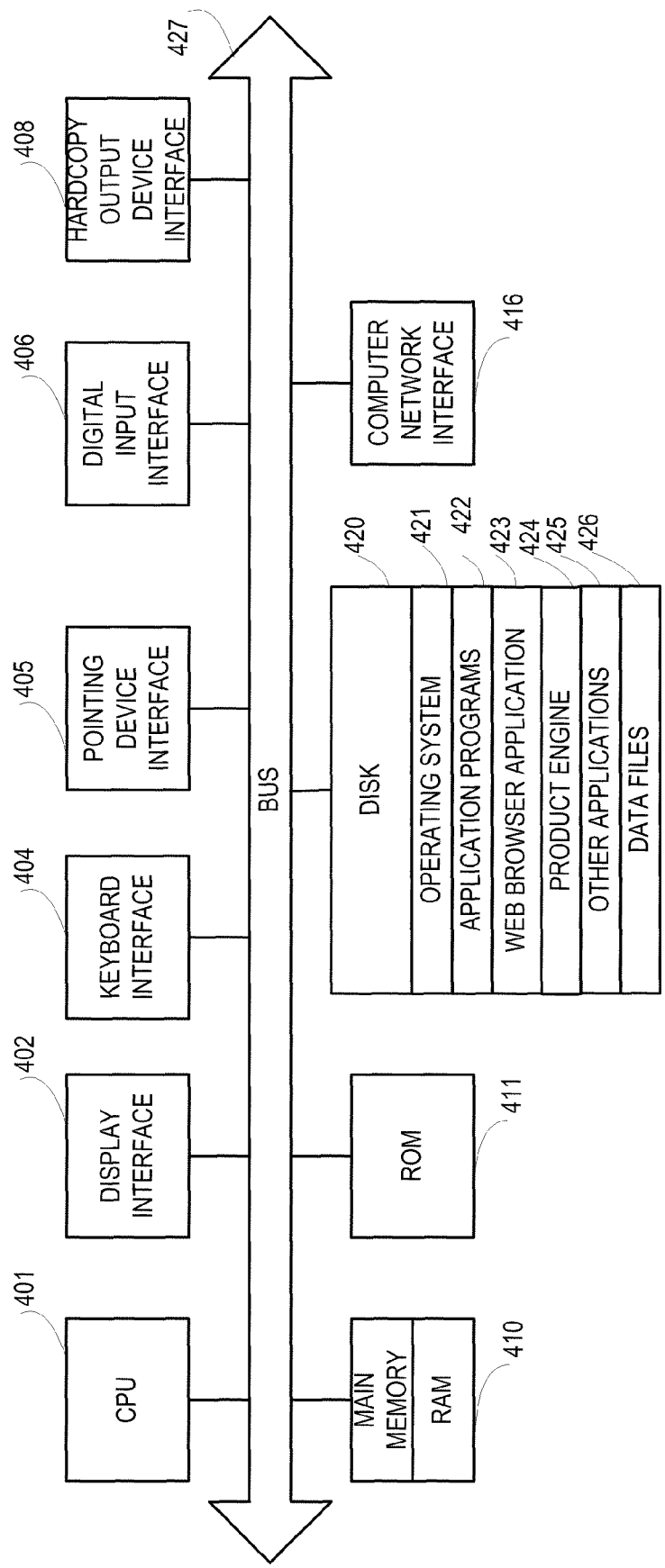
FIG. 4 is a schematic diagram of an example computer system that can be utilized to implement the systems and methods described herein.

FIG. 4 is a block diagram illustrating the internal architecture of an example computer system. The computing environment includes a computer central processing unit ("CPU") 401 where the computer instructions that comprise an operating system or an application are processed; a display interface 402 which provides a communication interface and processing functions for rendering graphics, images, and texts on a display monitor; a keyboard interface 404 which provides a communication interface to a keyboard; a pointing device interface 405 which provides a communication interface to a mouse or an equivalent pointing device; a digital input interface 406 which provides a communication interface to a video and audio detector; a hardcopy output device interface 408 which provides a communication interface to a hardcopy output device; a random access memory ("RAM") 410 where computer instructions and data are stored in a volatile memory device for processing by the computer CPU 401; a read-only memory ("ROM") 411 where invariant low-level systems code or data for basic system functions such as basic input and output ("I/O"), startup, or reception of keystrokes from a keyboard are stored in a non-volatile memory device; a storage 420 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 421, application programs 422 (including web browser application 423, product engine 424, and other applications 425 as necessary) and data files 426 are stored; and a computer network interface 416 which provides a communication interface to a network over a computer network connection. The constituent devices and the computer CPU 401 communicate with each other over the computer bus 427.

The RAM 410 interfaces with the computer bus 427 to provide quick RAM storage to the computer CPU 401 during the execution of software programs such as the operating system application programs, and device drivers. More specifically, the computer CPU 401 loads computer-executable process steps from fixed disk drives or other media into a field of the RAM 410 in order to execute software programs. Data is stored in the RAM 410, where the data is accessed by the computer CPU 401 during execution.

Also shown in FIG. 4, the product authentication system 108 can store computer-executable code for an operating system 421, and application programs 422 such as word processing, spreadsheet, presentation, gaming, web browsing, JavaScript engine, or other applications.

The computer CPU 401 is one of a number of high-performance computer processors, including an INTEL or AMD processor, a POWERPC processor, a MIPS reduced instruction set computer ("RISC") processor, a SPARC processor, an ACORN RISC Machine ("ARM") architecture processor, a HP ALPHASERVER processor or a proprietary computer processor for a mainframe. In an additional arrangement, the computer CPU 401 is more than one processing unit, including a multiple CPU configuration found in high-performance workstations and servers, or a multiple scalable processing unit found in mainframes.

The operating system 421 may be APPLE MAC OS X for INTEL and POWERPC based workstations and servers; MICROSOFT WINDOWS NT®/WINDOWS 2000/WINDOWS XP Workstation; MICROSOFT WINDOWS VISTA/ WINDOWS NT/WINDOWS 2000/WINDOWS XP Server; a variety of UNIX-flavored operating systems, including AIX for IBM workstations and servers, SUNOS for SUN workstations and servers, LINUX for INTEL CPU-based workstations and servers, HP UX WORKLOAD MANAGER for HP workstations and servers, IRIX for SGI workstations and servers, VAX/VMS for Digital Equipment Corporation computers, OPENVMS for HP ALPHASERVER-based computers; SYMBIAN OS, NEWTON, IPOD, WINDOWS MOBILE or WINDOWS CE, PALM, NOKIA OS ("NOS"), OSE, or EPOC for mobile devices, or a proprietary operating system for computers or embedded systems. The application development platform or framework for the operating system 421 may be BINARY RUNTIME ENVIRONMENT FOR WIRELESS ("BREW"); Java Platform, Micro Edition ("Java ME") or Java 2 Platform, Micro Edition ("J2ME"); PYTHON™, FLASH LITE, or MICROSOFT .NET Compact.

While FIG. 4 illustrates one possible implementation of a computing system that executes program code, or program or process steps, configured to make product authentication, other types of computers may also be used as well.

While the term "user" has been consistently used to describe an entity that interacts with these processes, such a generalization is also intended to describe multiple related or unrelated, living or automated entities or beings that interact with these processes at various different, overlapping or non-overlapping states. In a similar vein, the term "selection" is intended to denote throughout a manual selection by a human, an automatic selection by a non-human, or some combination thereof.

Finally, it is noted that, for the sake of brevity, the term "JavaScript" is intended to reference the SUN MICROSYSTEMS JAVASCRIPT programming language, and the term "XML" is intended to reference 'extensible Markup Language' throughout.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method of dynamically partitioning items within a database based on requests to enable multiple threads to process each partition in parallel without having to synchronize partitions, comprising:
receiving, at a stateless application program interface (API) of one or more backend servers, a first request to access a first set of items, wherein each item is associated with one or more properties;
receiving, at the stateless API, a second request to access a second set of items, the first request and the second request comprising complex processing requests;
determining, in response to receiving the first request and the second request, whether items from the first set of items are in the second set of items based on comparing the first set of items and the second set of items;
partitioning the first set of items into a plurality of subsets based on the determining, a first subset of the plurality of subsets including items that are in both the first set of items and the second set of items, and a second subset of the plurality of subsets including items that are in only the first set of items;

assigning the first subset and the second subset of the plurality of subsets to a first thread and a second thread, respectively;

processing the first thread and the second thread in parallel and without synchronization of the first subset and the second subset of the plurality of subsets using the one or more backend servers, wherein each of the one or more backend servers can handle every complex processing request as a result of and through the stateless API; and merging, using the one or more backend servers, the plurality of subsets into the first set of items subsequent to the processing.

2. The computer-implemented method of claim 1, wherein comparing the first set of items and the second set of items comprises comparing individual items.

3. The computer-implemented method of claim 1, wherein comparing the first set of items and the second set of items comprises comparing based on respective selection criteria.

4. The computer-implemented method of claim 1, wherein dividing the first set of items into one or more subsets based on the determining comprises:

identifying an intersection set between the first set of items and the second set of items; and identifying a remainder set between the first set of items and the second set of items, wherein the remainder set is every item not in the intersection set.

5. The computer-implemented method of claim 1, further comprising:

generating separate tables for one or more subsets with common properties.

6. The computer-implemented method of claim 1, further comprising:

providing a reference to one of the subsets in response to receiving a request for the first set of items or second set of items.

7. The computer-implemented method of claim 6, wherein the reference is a handle.

8. The computer-implemented method of claim 1, where the first request and the second request are simultaneous.

9. A system, comprising:

a processor of one or more backend servers;

a non-transitory computer-readable medium coupled to the processor and having instructions stored thereon, which, when executed by the processor, causes the processor to perform operations for dynamically partitioning items within a database based on requests to enable multiple threads to process each partition in parallel without having to synchronize partitions, the operations comprising:

receiving, at a stateless application program interface (API) of the one or more backend servers, a first request to access a first set of items, wherein each item is associated with one or more properties;

receiving, at the stateless API, a second request to access a second set of items, the first request and the second request comprising complex processing requests;

determining, in response to receiving the first request and the second request, whether items from the first set of items are in the second set of items based on comparing the first set of items and the second set of items;

partitioning the first set of items into a plurality of subsets based on the determining, a first subset of the plurality of subsets including items that are in both the first set of items and the second set of items, and a second subset of the plurality of subsets including items that are in only the first set of items;

assigning the first subset and the second subset of the plurality of subsets to a first thread and a second thread, respectively;

processing the first thread and the second thread in parallel and without synchronization of the first subset and the second subset of the plurality of subsets using the one or more backend servers, wherein each of the one or more backend servers can handle every complex processing request as a result of and through the stateless API; and merging the plurality of subsets into the first set of items subsequent to the processing.

10. The system of claim 9, wherein comparing the first set of items and the second set of items comprises comparing individual items.

11. The system of claim 9, further comprising operations including:

identifying an intersection set between the first set of items and the second set of items; and identifying a remainder set between the first set of items and the second set of items, wherein the remainder set is every item not in the intersection set.

12. The system of claim 9, further comprising operations including:

generating separate tables for one or more subsets with common properties.

13. The system of claim 9, further comprising operations including:

providing a reference to one of the subsets in response to receiving a request for the first set of items or second set of items.

14. The system of claim 13, wherein the reference is a handle.

15. The system of claim 9, where the first request and the second request are simultaneous.

16. A computer program product, tangibly embodied in a non-transitory machine-readable medium, the computer program product comprising instructions for dynamically partitioning items within a database based on requests to enable multiple threads to process each partition in parallel without having to synchronize partitions, and, when read by a machine, operate to cause data processing apparatus to:

receive, at a stateless application program interface (API) of one or more backend servers, a first request to access a first set of items, wherein each item is associated with one or more properties;

receive, at the stateless API, a second request to access a second set of items, the first request and the second request comprising complex processing requests;

determine, in response to receiving the first request and the second request, whether items from the first set of items are in the second set of items based on comparing the first set of items and the second set of items;

partition the first set of items into a plurality of subsets based on the determining, a first subset of the plurality of subsets including items that are in both the first set of items and the second set of items, and a second subset of the plurality of subsets including items that are in only the first set of items;

assign the first subset and the second subset of the plurality of subsets to a first thread and a second thread, respectively;

process the first thread and the second thread in parallel and without synchronization of the first subset and the second subset of the plurality of subsets using the one or more backend servers, wherein each of the one or more backend servers can handle every complex processing request as a result of and through the stateless API; and merge the plurality of subsets into the first set of items subsequent to the processing.

17. The computer program product of claim 16, wherein comparing the first set of items and the second set of items comprises comparing by individual items.

18. The computer program product of claim 16, wherein comparing the first set of items and the second set of items comprises comparing based on respective selection criteria.

19. The computer program product of claim 16, wherein dividing the first set of items into one or more subsets based on the determining comprises:

identify an intersection set between the first set of items and the second set of items; and identify a remainder set between the first set of items and the second set of items, wherein the remainder set is every item not in the intersection set.

20. The computer program product of claim 16, further comprising:

generate separate tables for one or more subsets with common properties.

* * * * *